United States Patent [19]
Shiratori

[11] Patent Number: 5,135,439
[45] Date of Patent: Aug. 4, 1992

[54] ROLLER ELEMENTS FOR PLAYGROUND SLIDES

[75] Inventor: Koji Shiratori, Shizuoka, Japan

[73] Assignee: Shiratori Co., Ltd., Japan

[21] Appl. No.: 600,851

[22] Filed: Oct. 22, 1990

[51] Int. Cl.$^5$ .............................................. A63G 21/00
[52] U.S. Cl. ....................................... 472/116; 193/35
[58] Field of Search ................... 272/56.5 R, 56.5 SS; 193/35

[56] References Cited

U.S. PATENT DOCUMENTS

| | | | |
|---|---|---|---|
| 1,707,854 | 4/1929 | Hanlon | 272/56.5 R |
| 2,170,935 | 8/1939 | Whiteley | 272/56.5 R |
| 3,385,599 | 5/1968 | Davis | 272/56.5 R |

FOREIGN PATENT DOCUMENTS

| | | | |
|---|---|---|---|
| 448718 | 8/1927 | Fed. Rep. of Germany | 272/565 R |
| 180714 | 4/1936 | Switzerland | 272/56.5 SS |

OTHER PUBLICATIONS

Wave Tek International, Inc., "Rampage . . . the Roller Coaster with a Splash at the End".

*Primary Examiner*—Richard E. Chilcot, Jr.

[57] ABSTRACT

A roller element for a slide comprising an outer cylinder, an inner pipe and connector members for making connections therebetween all integrally formed of a material having a suitable elasticity, wear resistance, weather resistance, etc. wherein the outer cylinder has a thickness sufficient to make it deformable, and stopper slightly shorter than the space formed between the outer cylinder and the inner pipe are provided to limit the amount of deformation of the outer cylinder, alternatively ribs for connector members which are connected to the outer cylinder and inner pipe on a reduced-diameter side of the outer cylinder, and connected to the inner pipe alone on an increased-diameter side of the outer cylinder to form a gap of about 2-3 mm between the outer edge of the inner pipe and the inner face of the outer cylinder.

14 Claims, 4 Drawing Sheets

ROLLER ELEMENTS FOR PLAYGROUND SLIDES

BACKGROUND OF THE INVENTION

1. Field of the Invention

The present invention relates to a roller element forming an array of rollers in a roller slide.

2. Statement of the Prior Art

Most of currently available slides are of the roller type.

A typical roller slide is constructed with a pair of side plates which have a multiplicity of freely rotating rollers therebetween, each being assembled by loosely fitted roller elements of 50–120 mm in length and 35–50 mm in diameter on a support shaft and are juxtaposed together to provide a sliding lane.

Consequently, this type of a slide results in little or no, sliding between a player and the roller surfaces and thus exhibits decreased apparent sliding friction of the lane than a conventional slide whose sliding plane is made of a planar material. It is thus most unlikely that frictional heat may be generated by sliding friction with the sliding lane or that a player's clothing may become worn.

However, a problem with the freely rotating rollers of the aforesaid roller slide is that they are so rigid as to cause pain to the hip of players, etc. due to the use of materials such as nylon which have increased wear resistance or weather resistance.

Another typical roller slide is constructed having a pair of side plates and a number of freely rotating rollers arranged side by side therebetween to provide a sliding lane, each of said rollers being defined by four roller elements, each having a length of about 50–120 mm and a diameter of about 30–45 mm at one end and about 35–50 mm at the other end and increasing in thickness from the reduced-diameter end toward the increased-diameter end.

Of the four roller elements forming each of the freely rotating rollers of this conventional roller slide, the two outer roller elements are arranged with the increased-diameter ends outside and the two inner roller elements are arranged with the increased-diameter ends at the center, so that the sliding lane slopes down gently from the center to the lowermost positions, whence it slopes up gently.

While players slide on this slide, it is most likely that they may feel less pain on their hips, since their hips are properly fitted on the center of the sliding lane with their thighs on the right and left lowermost positions. In addition, even when they do not hold themselves erect during sliding, they can slide on the slide along its center line in a stable manner. This is because their thighs may return from either side to the center.

However, this roller slide suffers from such a disadvantage as mentioned in connection with the first-mentioned roller slide.

Another problem with this roller slide is that the roller elements not only have difficulty in rotating due to the support shaft being fixed against rotation, but the support shaft collides with holes in the side plates whenever sliding is complete, making an impactive noise.

SUMMARY OF THE INVENTION

The present invention seeks to provide a roller element which suffers no degradation of given wear resistance, weather resistance, etc., rolls smoothly without making noise, and which is apparently flexible and causes no pain to the hips of players, while they slide on it.

According to one aspect of this invention, there is provided a roller element for a slide, having a length of 50–120 mm and a diameter of 35–50 mm and comprising an outer cylinder, an inner pipe and connector members for making connections therebetween, which are all integrally formed of a material having a suitable elasticity, wear resistance, weather resistance, etc. such as nylon, said roller element being designed such that, when a part of the outer cylinder receives an external force larger than normal force, it deforms and absorbs that force, and further including stops between the inner pipe and the outer cylinder to limit the amount of deformation of the outer cylinder.

The connector members may be provided at any position on the roller element to limit the region of the outer cylinder to be deformed. Alternatively, the connector members themselves may be of deformability sufficient to deform all regions of the outer cylinder.

The stops may also function as ribs for the outer cylinder and inner pipe.

According to another aspect of this invention, there is provided a roller element comprising an outer cylinder having a length of about 50–120 mm, a diameter of about 35–50 mm at one end and a diameter of about 30–45 mm at the other end and increasing in thickness from the reduced-diameter end toward the increased-diameter end, an inner pipe and ribs, which are all integrally formed of a material having a suitable elasticity, wear resistance, weather resistance, etc. such as nylon, said ribs being connected to the outer cylinder and inner pipe at the reduced-diameter side of the outer cylinder and being connected to the inner pipe alone on the increased-diameter side of the outer cylinder to form a gap of about 2–3 mm between the outer edge of the inner pipe and the inner face of the outer cylinder, thereby enabling the increased-diameter side of the outer cylinder to be easily deformable.

The roller element for a slide according to the first aspect of this invention is constructed with an outer cylinder, an inner pipe and connector members for making connections therebetween, whereby deformability is imparted to the outer cylinder. When a part of the outer cylinder receives an external force larger than normal force, it deforms and absorbs that external force, thereby relieving impacts on the hip of players etc.

The roller element for a slide according to the second aspect of this invention is constructed with an outer cylinder, an inner pipe and ribs which are all integrally formed of a material having a suitable elasticity, wear resistance, weather resistance, etc. such as nylon. In particular, the ribs are connected to the outer cylinder and inner pipe on the reduced-diameter side of the outer cylinder, whereby both are reinforced simultaneously with the inner pipe being tightly fixed to the outer cylinder.

At the increased-diameter side of the outer cylinder, the ribs are connected to the inner pipe alone to form a gap of about 2–3 mm between the outer edge of the inner pipe and the inner face of the outer cylinder. Thus, the junctions of the inner pipe with the ribs are reinforced, while the outer cylinder is left so free that it can deform upon receiving an external force. In addition, since the amount of deformation of the outer cylinder is limited by the ribs, no further deformation of the outer cylinder takes place even when the external force becomes large.

BRIEF DESCRIPTION OF THE DRAWINGS

The present invention will now be explained in greater detail with reference to the accompanying drawings given for the purpose of illustration alone, in which.

DESCRIPTION OF THE ILLUSTRATIVE EMBODIMENTS

One embodiment of this invention will now be explained with reference to FIGS. 1-4.

Figure 1:
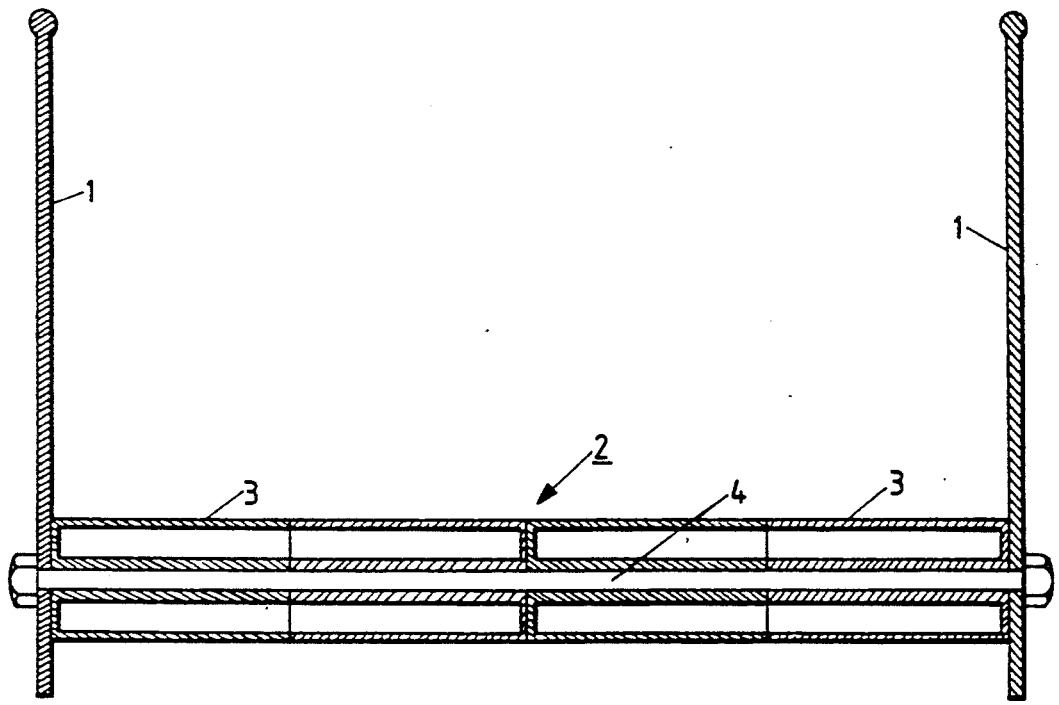
FIG. 1 is a longitudinally sectioned front view of a sliding lane of a roller slider to which the roller element according to one embodiment of this invention is applied.

Referring to FIG. 1, there is shown a sliding lane of a roller slider, which is basically similar in structure to a conventional roller slide. The sliding lane is constructed with a pair of side plates 1 and a multiplicity of freely rotating roller 2. The roller 2 is defined by several roller elements 3 loosely fitted onto a support shaft 4. The rollers are arranged at certain intervals between the side plates 1 and 1 to provide the sliding lane.

The roller element 3 comprises an outer cylinder 31, an inner pipe 32 and connector members 33 for making connections therebetween, which are all integrally formed of a material having a suitable elasticity, wear resistance, weather resistance, etc. such as nylon.

Having a length of about 50-120 mm, a diameter of about 35-50 mm and a thickness of about 2-4 mm, the outer cylinder 31 defines the profile of the roller element 3 which, upon receiving an external force larger than normal force, is made flat or bent or otherwise deformed to absorb it.

The inner pipe 32 is in the form of a tube having an inner diameter substantially equal to the diameter of the support shaft 4, and is fitted onto the support shaft 4 to locate and maintain the outer cylinder 31 at a given position.

The connector members 33 cannot the outer cylinder 31 and the inner pipe 32, and are integrally formed. The inner pipe 32 is provided with stops 34 to narrow an apparent space between the outer cylinder 31 and the inner pipe 32, so that the outer cylinder 31 can be restrained against a deformation larger than normal deformation even under the action of a larger external force. It is understood that while the stops 34 are shown mounted on the inner pipe 32, they may be formed on the inner face of the outer cylinder 31 or on both the inner pipe and the inner face of the outer cylinder in opposite relation. The stop 34 acts inevitably as a rib and should be so positioned for this purpose.

Figure 2:
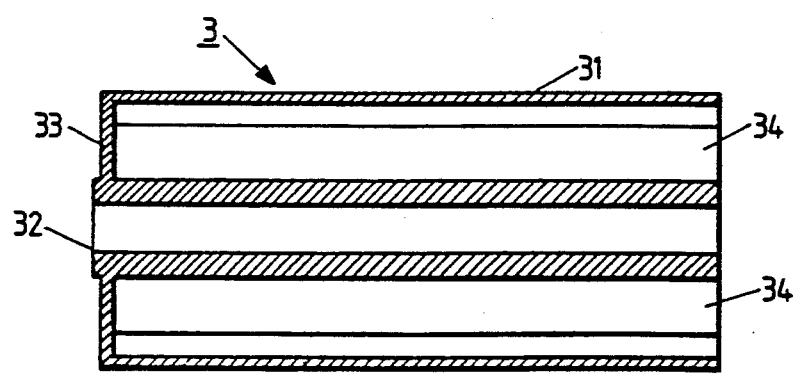
FIG. 2 is a longitudinally sectioned side view of one example of the roller element of this invention.

In an alternative instance shown in FIG. 2, a connector member 33 is located eccentrically with respect to a roller element 3, so that the outer cylinder 31 varies in deformability (or apparent flexibility) between the side including the connector 33 and the opposite side. In other words, the roller element 3 suffers little deformation on the side including the connector members 33, but the closer the opposite side, the more likely it is to deform. Consequently, this roller element 3 is well-suited for a slide whose freely rotating roller 2 is constructed with four roller elements, as illustrated in FIG. 1.

Figure 3:
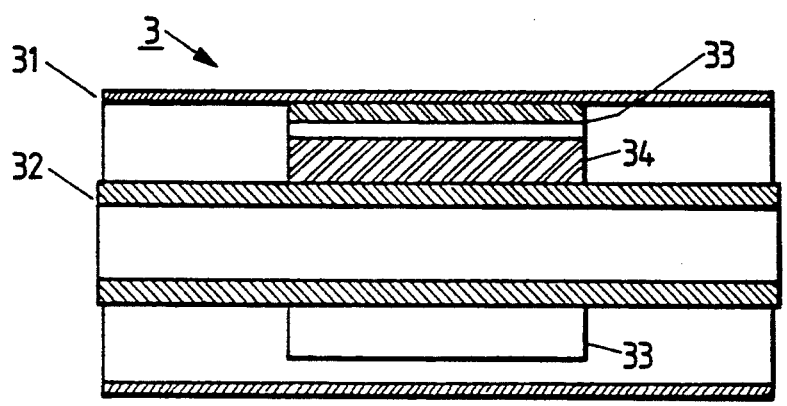
FIG. 3 is a longitudinally sectioned side view of another example of the roller element of this invention.
Figure 4:
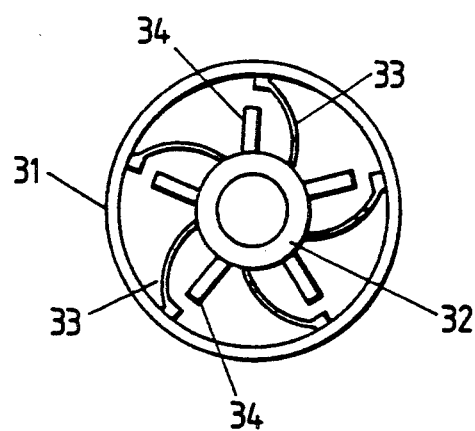
FIG. 4 is a longitudinally sectioned front view of the another example of this invention.

In a still alternative instance as shown in FIG. 3, a connector member 33 is formed by bending or other processing to impart a suitable deformability to it, and is located at the center of a roller element, whereby the roller element 3 has a uniform deformability throughout.

Figure 5:
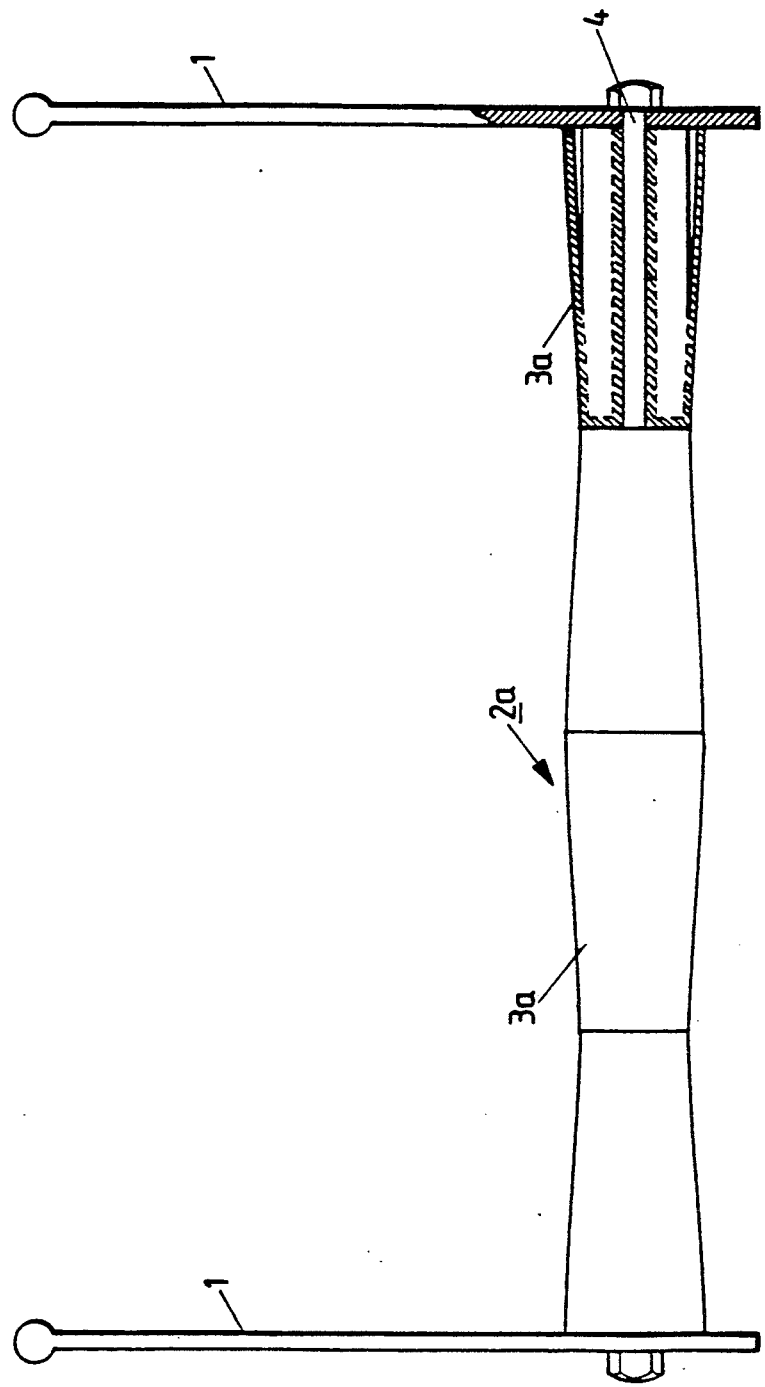
FIG. 5 is a partly cut-away front view showing a sliding lane of a roller slide to which the roller element according to another embodiment of this invention is applied.
Figure 6:
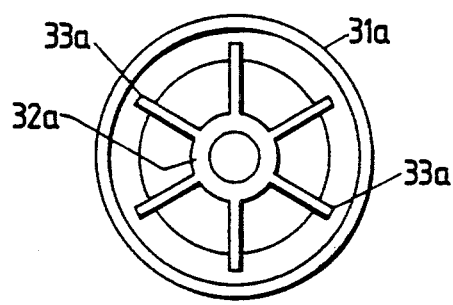
FIG. 6 is a side view showing one example of the roller element of this invention.
Figure 7:
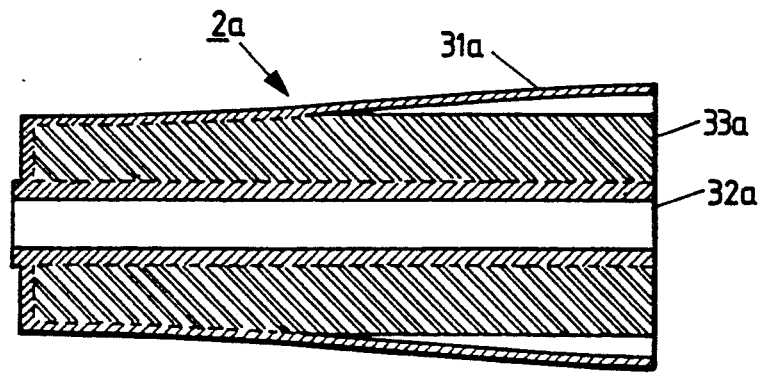
FIG. 7 is a longitudinally sectioned view of that example of this invention.

Referring then to FIGS. 5-7, another embodiment of this invention will be explained.

FIG. 5 is a longitudinally sectional view of a sliding lane of a roller slider.

The sliding lane is basically similar in structure to a conventional sliding lane. Reference numerals 1 and 1 stand for side plates, between which a number of freely rotating rollers 2a are arranged side by side to provide the sliding lane. In particular, the roller 2a is constructed with four roller elements 3a, each tapering from one end toward the other end. Thus, the sliding lane slopes down gently from the center to the lowermost positions, whence it slopes up gently.

The roller element 3a comprises an outer cylinder 31a, an inner pipe 32a and ribs 33a, which are all integrally formed of a material having a suitable elasticity, wear resistance, weather resistance, etc. such as nylon.

Having a length of about 50-120 mm and a diameter of about 30-45 mm at one end and about 35-50 mm at the other end, the outer cylinder 31a increases in thickness from the reduced-diameter end toward the increased-diameter end, thus forming the profile of the roller element 3a.

The reduced-diameter end is integrally contiguous to the inner pipe 32a, while the increased-diameter end is open. Upon receiving an external force, the latter end deforms and absorbs it. The inner pipe 32a is in the form of a tube having an inner diameter substantially equal to the diameter of a support shaft 4, and is fitted onto the support shaft 4 to locate and maintain the outer cylinder 31a at a given position thereon.

The rib 33a is connected to both the outer cylinder 31a and the inner pipe 32a on the reduced-diameter side of the roller element 3a to reinforce both cylinder and pipe and, at the same time, provide a tight fixation of the outer cylinder 31a to the inner pipe 32a, but is connected to the inner pipe 32a alone on the increased-diameter side to reinforce this part of the inner pipe 32a and leave the associated part of the outer cylinder 31a free. In particular, there is a gap of about 2-3 mm between the outer edge of this part of the rib 33a and the inner face of the outer cylinder 31a to ensure that even when a large force is applied to the outer cylinder 31a, it deforms into contact with the outer edge of the rib 33a, so that its further deformation can be prevented.

Figure 8:
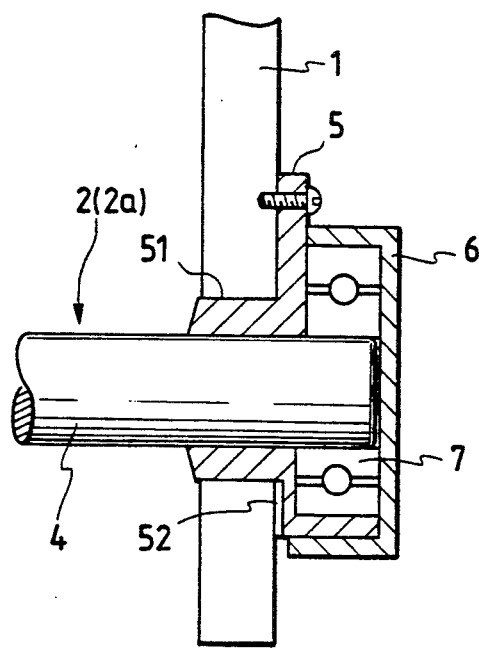
FIG. 8 is a partly sectioned view of one example of the bearing protecting structure according to this invention.

In order to protect the junction of the end of the roller 2 (or 2a) with the side plate 1 against sunlight, wind, rain, snow, dust, etc., it is preferred that a bearing 7 be covered with a bearing holder 5 and a bearing cover 6, as illustrated in FIG. 8.

A boss 51 of the bearing holder 5 functions as a bushing between the support shaft 4 and a hole in the side plate 1.

Additionally, a slot 52 is provided on the back side of the bearing holder 5 to allow moisture sucked from the junction of the boss 51 with the side plate 1 to be later discharged therefrom.

As detailed above, the roller element of this invention is constructed from an outer cylinder, an inner pipe and connector member to provide a freely rotating roller defining a sliding lane of a roller slide, said outer cylinder being of deformability. When a part of the outer cylinder receives an external force, it deforms and absorbs that external force. As a result, the roller is made apparently so flexible as to cause no pain to the hips of players while they slide on it, thus presenting greater advantages to the roller slide.

According to this invention, another roller element is constructed with an outer cylinder, an inner pipe and ribs to provide a roller defining a sliding lane of a roller slide. In particular, this roller element is open on the increased-diameter side of the outer cylinder, so that upon receiving an external force, that side of the outer cylinder can deform and absorb the external force, but no further deformation of the outer cylinder takes place even when the external force becomes large. Consequently, the increased-diameter side of the outer cylinder is thinned so that the roller element can deform more easily.

What is claimed is:

1. A roller element for use in connection with a slide, comprising an outer deformable cylindrical sleeve member, an inner tubular member positioned within and spaced from said outer cylindrical sleeve member whereby an annular space is formed therebetween, connector means fixedly attaching said outer cylindrical sleeve member to said inner tubular member, and stop means positioned in the annular space between said outer cylindrical sleeve member and said inner tubular member having a dimension less than that of the annular space, whereby the degree of deformation of said outer cylindical sleeve member toward said inner tubular member is limited by the presence of said stop means.

2. The roller element of claim 1 wherein said outer deformable cylindrical sleeve member is formed of nylon.

3. The roller element of claim 1 wherein said stop means comprises multiple stop elements formed on the inner face of said outer deformable cylindrical sleeve member.

4. The roller element of claim 1 wherein said stop means comprises multiple stop elements formed on the outer face of said inner tubular means.

5. The roller element of claim 1 wherein said stop means comprises multiple stop elements formed on both the inner surface of the outer deformable cylindrical sleeve member and an opposing outer surface of the inner tubular member in opposing spaced relation to one another.

6. The roller element of claim 1 wherein said connector means is deformable.

7. The roller element of claim 1 having a length in the range of from 50 to 120 mm and a diameter of from 35 to 50 mm.

8. The roller element of claim 7 wherein said outer deformable cylindrical sleeve member has a thickness in the range of from about 2 to 4 mm.

9. The roller element of claim 1 wherein said stop means comprises ribs.

10. A roller element for use in connection with a slide, comprising an outer deformable cylindrical sleeve member having a first end and a second end having a greater diameter than said first end, said sleeve member increasing in diameter from said first end toward said second end, an inner tubular member positioned within and spaced from said outer cylindrical sleeve member whereby an annular space is formed therebetween, connector means fixedly attaching said outer cylindrical sleeve member to said inner tubular member, and stop means positioned in the annular space between said outer cylindrical sleeve member and said inner tubular member having a dimension less than that of the annular space, whereby the degree of deformation of said outer cylindrical sleeve member toward said inner tubular member is limited by the presence of said stop means.

11. The roller element of claim 10 wherein said stop means are connected to both an inner surface of said outer cylindrical sleeve member and an opposing outer surface of said inner tubular member along a first portion of said roller element, and said stop means being connected only to an outer surface of said inner tubular member along a second portion of said roller element.

12. The roller element of claim 11, wherein said outer cylindrical sleeve member has a length of from about 50 to 120 mm, a diameter of from about 30 to 45 mm at said first end, and a diameter of from about 35 to 50 at said second end.

13. The roller element of claim 12 wherein a gap of from about 2 to 3 mm is formed between said stop means and said outer cylindrical sleeve member along said second portion of said roller element.

14. The roller element of claim 10 wherein said stop means comprise ribs.

* * * * *